United States Patent [19]
Fukasaku et al.

[11] Patent Number: 4,626,720
[45] Date of Patent: Dec. 2, 1986

[54] COOLING APPARATUS FOR MOTOR MEANS TO PROTECT COMMUTATOR FROM DUST AND MOISTURE IN COOLING AIR

[75] Inventors: Yoshinori Fukasaku, Hitachi; Kunihiro Noto; Reijiro Takahashi, both of Katsuta, all of Japan

[73] Assignee: Hitachi, Ltd., Tokyo, Japan

[21] Appl. No.: 676,925

[22] Filed: Nov. 30, 1984

Related U.S. Application Data

[63] Continuation of Ser. No. 354,612, Mar. 4, 1982.

[30] Foreign Application Priority Data

Mar. 6, 1981 [JP] Japan .................................. 31345/81

[51] Int. Cl.[4] ............................................. H02K 9/06
[52] U.S. Cl. ....................................... 310/62; 310/59; 310/63; 310/88; 310/89; 310/227
[58] Field of Search ............... 310/88, 43, 71, 227, 310/52, 53, 55, 56, 57, 58, 59, 60 R, 62, 63, 64, 65, 89, 233, 236, 154

[56] References Cited

U.S. PATENT DOCUMENTS

| | | | |
|---|---|---|---|
| 1,222,465 | 4/1917 | Priest | 310/227 |
| 3,243,618 | 3/1966 | Ward | 310/88 |
| 4,092,556 | 5/1978 | Mabuchi | 310/227 |
| 4,119,873 | 10/1978 | Sakurai | 310/56 |

FOREIGN PATENT DOCUMENTS

| | | | |
|---|---|---|---|
| 1005640 | 4/1952 | France | 310/53 |
| 0072107 | 5/1977 | Japan | 310/52 |

*Primary Examiner*—R. Skudy
*Attorney, Agent, or Firm*—Antonelli, Terry & Wands

[57] ABSTRACT

Cooling air is introduced through an opening in a wall portion of the motor housing radially opposing the commutator. A deflecting surface is provided for deflecting the cooling air entering the motor through the opening away from the commutator and toward the armature so as to prevent direct contact of dust and moisture in the cooling air with the commutator.

9 Claims, 6 Drawing Figures

COOLING APPARATUS FOR MOTOR MEANS TO PROTECT COMMUTATOR FROM DUST AND MOISTURE IN COOLING AIR

This is a continuation of Application Ser. No. 354,612 filed Mar. 4, 1982.

BACKGROUND OF THE INVENTION

1. Field of the Invention

The present invention relates to a cooling apparatus for a motor means and, more particularly, to a cooling apparatus for a motor means incorporated in a blower system.

2. Description of the Prior Art

Generally, the overheating of motors is caused mainly by heat generated in an armature of a motor; therefore, an effective measure for preventing the overheating of the motor is to cool the armature.

A known cooling arrangement has a pair of holes formed in radially opposing portions of a peripheral wall of a motor housing encasing an armature or, alternatively, in both axial end walls of the motor housing. Cooling air is introduced through one of these holes and, after flowing around the armature, is discharged to an outside of the motor through the other hole.

Japanese Utility Model Laid-open Publication No. 72107/1977 discloses an arrangement for cooling a motor used in a blower system wherein the motor has a housing, an armature fixed to a motor shaft and housed by the housing, a blower fan attached to one end of the shaft projecting to the outside of the housing through one of two axial end walls, and a blower casing encasing the blower fan. An air introduction hole is formed in a portion of the housing remote from the blower fan, while an air discharge hole is formed in the portion of the housing being adjacent to the blower fan and facing a space in which the air pressure is lower than that in a space around the air introduction hole. In operation, the cooling air is induced through the air introduction hole by the lower pressure in the space around the air discharge hole and, after flowing around the armature to cool it down, discharged to the outside of the motor through the discharge hole.

Generally, in a motor used in a blower system, a commutator and brushes are provided at the space in the motor axially opposite to a blower fan in order to prevent a noise transmission to the outside through the fan casing, which is produced as a result of the sliding contact between the brushes and the commutator. Consequently, the air introduction hole is inevitably positioned at a position in opposition to the commutator.

It is generally impossible to eliminate the moisture and the dust from the air introduced through the air introduction hole without an additional elimination means. The moisture and the dust both contained in the introduced cooling air directly collide with and attach to the peripheral surface of the commutator. As the motor operates for a long time under such a condition, the moisture and the dust fill the gaps between adjacent copper elongate strips which are arranged on a core surface at a constant pitch in the circumferential direction. Consequently, the copper elongate strips are electrically sshort-circuited and an overcurent flows to rapidly increase the calorific value. The electric short-circuiting also generates sparks between adjacent copper elongate strips to roughen the surfaces thereof. This roughening undesirably deteriorates the out of roundness of the commutator and the sliding friction between the commutator and the brushes is increased to generate noise.

SUMMARY OF THE INVENTION

Accordingly, an object of the present invention is to provide an improved motor cooling apparatus which prevents the moisture and the dust in the cooling air from attaching to the commutator surface.

To this end, according to the present invention, there is provided a motor cooling apparatus characterized by comprising a deflecting means attached to a stationary part in the motor housing located at the downstream side of the commutator, as viewed in the direction of flow of the cooling air, with the deflecting means being adapted to deflect the flow of the cooling air toward the armature, thereby preventing a direct contact of the moisture and the dust in the cooling air with the peripheral surface of the commutator.

DESCRIPTION OF THE PREFERRED EMBODIMENTS

Figure 1:
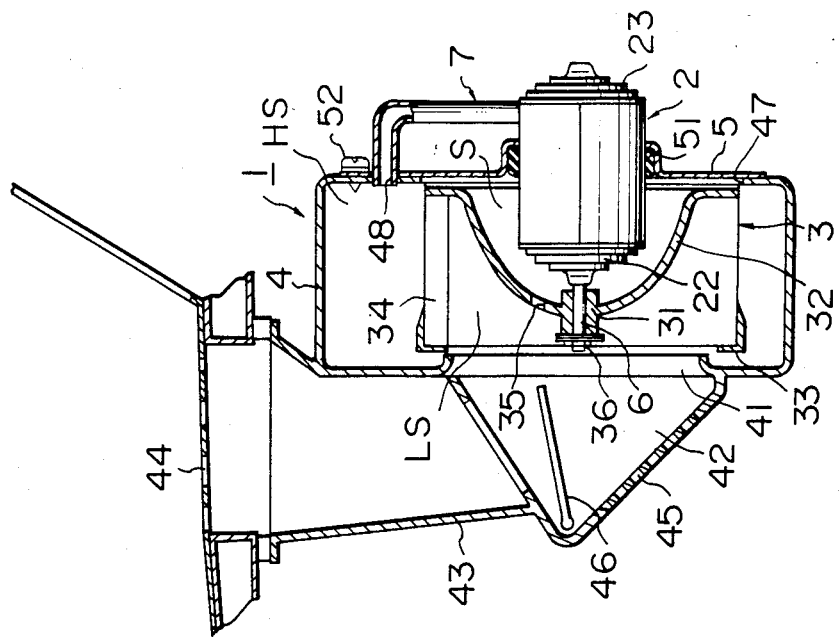
FIG. 1 is a fragmentary vertical cross sectional view of a blower system of an automobile air conditioner, incorporating a motor cooling apparatus in accordance with an embodiment of the present invention.

Referring now to the drawings wherein like reference numerals are used throughout the various views to designate like parts and, more particularly, to FIG. 1, according to this figure a blower apparatus 1 of a blower system of an automobile air conditioner for cooling a passenger compartment of an automobile includes a motor means 2, fan means generally designated by the reference number 3 adapted to be driven by the motor means 2, and a scroll-shaped casing 4 rotatably accommodating the fan means 3. An air inlet 41 is formed in one of two axial end walls of the scroll-shaped casing 4, with the air inlet 41 being in communication with the atmosphere through an air chamber 42, air introduction duct 43, and an air intake 44 provided in the outer panel of an automobile. The air inlet 41 also communicates with the air in the compartment of the automobile through the air chamber 42 and an internal air intake 45 formed in the wall defining the air chamber 42. The air inlet 41 is selectively brought into communication with the atmosphere or the air in the compartment. The switching of the communication is achieved by means of a change-over plate valve 46 pivotally mounted in the air chamber 42. The other axial end wall of the scroll-shaped casing 4 is provided with a large opening 47 through which a fan assembly including the motor means 2 and the fan means 3 is inserted into the scroll-shaped casing 4.

The motor means 2 of the fan assembly is forcibly fixed into a flange portion of a bracket 5 through a rubber ring 51, with the bracket 5 supporting the fan assembly being secured to the other axial end wall of the scroll-shaped casing 4 by means of a plurality of fixing screws 52 arranged at a constant circumferential pitch at the radially outer portion of the opening 47.

The fan means 3 of the fan assembly has a substantially cup-shaped side wall 32 provided at its center with a thick-walled hub 31 and, at its periphery, with a flat portion and concaved toward the center, another side wall 33, having a hollow disk-like form, and a plurality of blades 34 interconnecting both peripheral portions of the side walls and extending at an inclination to diametrical planes to the side walls at a constant circumferential pitch. A plurality of holes 35 are formed in the portion of the side wall 32 near the hub 31 and same radial distance apart from the hub 31 at a constant circumferential pitch. The fan means 3 is fastened at its hub 31 by a nut 36 to the end of the shaft 6 of the motor means 2 projecting out of the end wall in such a manner that the outer peripheral flat portion of the side wall 32 is positioned in the close proximity of a bracket 5 as the fan assembly is mounted in the scroll-shaped casing 4.

Figure 2:
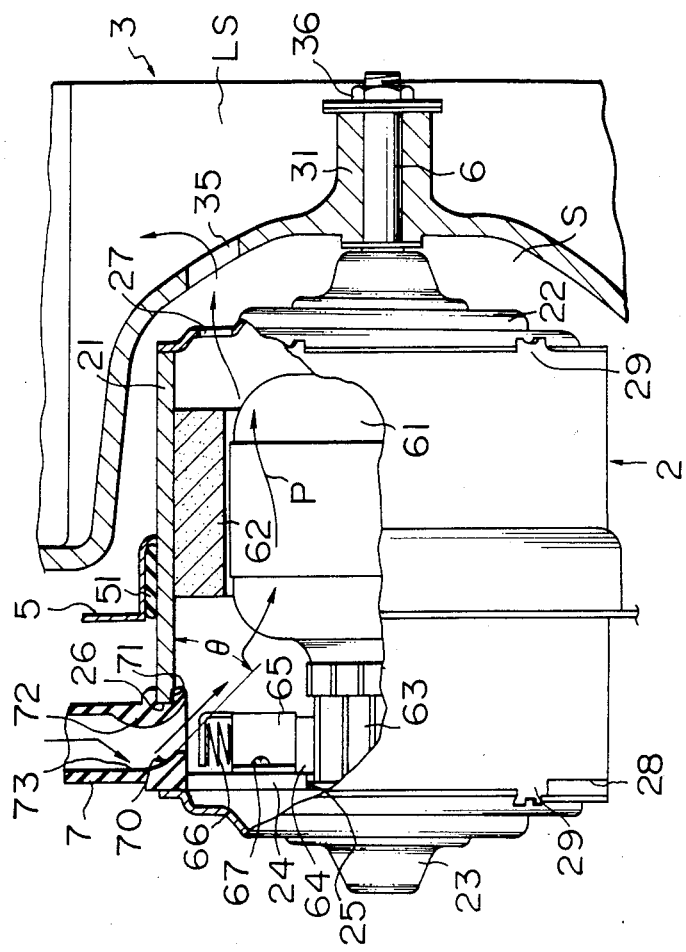
FIG. 2 is a fragmentary cross sectional view on an enlarged scale, of a motor and associated members incorporated in the blower system shown in FIG. 1.

As shown in FIGS. 1 and 2, the motor means 2 includes a thin-walled hollow cylindrical housing 21 opened at both ends thereof, with both end walls 22, 23 being slightly projected outwardly at central portions thereof. A shaft 6, projecting out of the end wall 22, is rotatably supported by bearings (not shown) provided in central portions of respective end walls 22, 23. A pair of permanent magnets 62,62 having a substantially tube half shape and of the same size, are provided on the inner peripheral surface of the housing 21 at an equal circumferential pitch therebetween. An armature 61 includes an iron core provided in its outer peripheral portion with a plurality of axial slots, formed at a constant circumferential pitch, and a coated wire wound in the axial slots. The armature 61 is mounted on the portion of the shaft 6 opposed to the permanent magnets 62,62 with a constant radial air gap of 0.2 to 0.5 mm between concaved inner peripheral surfaces of the permanent magnets 62,62 and the outer peripheral surface of the armature 61. A commutator 63, having a plurality of copper elongate strips arranged at a constant circumferential pitch, is mounted on the portion of the shaft 6 opposite to the projected end of the shaft 6 and adjacent to the armature 61. The commutator 63 and the armature 61 are electrically connected to each other. A brush base 24 is inserted between the end wall 23 and the housing 21. The brush base 24 is provided at its center with an opening 25 for receiving the commutator 63 and processed at its both longitudinal ends into arcuate form to match the outer configuration of the housing 21. The brush base 24, as a whole, has a thick-walled substantially rectangular form.

Brush holders 65 are fixed by scress 67 to the surface of the brush base 24 facing to the armature 61. Each brush holder 65 holds therein a brush 64 and a spring 66. The brushes 64 are pressed by springs 66 onto the peripheral surface of the commutator 63 at a suitable pressure thereby supplying electric power to the commutator 63. A rectangular opening 26 is formed in a side wall portion of the housing 21 at a position radially opposite to the commutator 63. On the other hand, a hole 27 is formed in an outer peripheral portion of the end wall 22.

A bore 48 is formed through the thickness of the side wall of the scroll-shaped casing 4 and the thickness of the bracket 5. A rubber hose generally designated by the reference numeral 7, which is provided in its outer peripheral surface of one end thereof with a groove 71 for engaging the brim of the opening 26, engages at its other end with a hole 48, thereby providing a communication between the space in the motor means 2 and a space of a comparatively high pressure in the scroll-shaped casing 4.

The motor means 2 having the described construction is assembled in the following manner. First of all, a pair of metallic plates of an equal size are prepared and curved by a press work or the like into tube halves. The arcuate shaped permanent magnet 62, which is beforehand applied with a thermoplastic adhesive uniformly over the convex outer surface thereof, is placed on the concaved surface of the tube half. The tube half and the arcuate shaped permanent magnet 62 are heated in an electric heating furnace so as to cause the magnet 62 to adhere to the tube half. The two assemblies each of which have the tube half and the arcuate shaped permanent magnet 62 are assembled together to form the tubular housing 21 which is secured to the flange of the bracket 5 through a rubber ring 51. In order to form a shaft assembly, the armature 61 and the commutator 63 are mounted on the shaft 6 in such a manner that the armature 61 and the commutator 63 are adjacent to each other in the axial direction. The shaft assembly is then located in the tubular housing 21 in such a manner that the armature 61 is axially aligned with the permanent magnets 62. The end of the shaft 6 to which the fan means 3 is to be secured, is inserted into the end wall 22 so that the shaft 6 is supported by a bearing mounted in the end wall 22. With the surface having brush holders 65 directed toward the commutator 63, the brush base 24 is inserted from the shaft end adjacent to the commutator 63 so as to be seated in two recesses 28 formed in the end edge of the housing 21 for receiving the brush base 24. Then, the end wall 23 is fitted from the outer side to the end of the housing 21 and bears the shaft 6 by a bearing therein.

The outer peripheral edges of both end walls 22, 23 are beforehand provided with recesses for receiving projections 29 formed on the opposite end edges of the housing 21 at a constant circumferential pitch. Each projection 29 is recessed at its center. After fitting the end walls 22, 23 to the tubular housing 21, the central recess of the projection 29 is spread outwardly by a specific jig and the tubular housing 21 and both end walls 22 and 23 are caulked together to complete assembly of the motor means 2. Needless to say, the opening 26 is formed in the flat blank sheet before the latter is bent into the tube half. Similarly, the hole 27 is beforehand formed in the end wall 22. Then, the fan means 3 is fixed by a nut 36 to the portion of the shaft projecting out of the end wall 22 of the motor means 2 and is placed in the scroll-shaped casing 4. Then, the bracket 5 is fixed to the side wall of the scroll-shaped casing 4.

To explain in more detail, the hose 7 providing the communication between the space in the scroll-shaped casing 4 and the space in the motor means 2, the hose 7 is formed by an injection molding from rubber. A radial inward projection 72 is formed integrally on the portion of the inner surface of the end portion of the hose 7 engaging the opening 26 of the housing 21, adjacent to the armature 61 when the hose 7 is fitted to the opening 26. Also, a wall surface 73, curved toward the armature 61, is formed on the portion of the inner surface of the hose 7 in opposition to the inward projection 72.

The blower apparatus 1 shown in FIG. 1 operates in the following manner. As the motor means 2 is supplied with electric power to drive the fan means 3, the atmosphere or internal air of the compartment is induced or drawn through the air introduction hole 41 into the scroll-shaped casing 4 in the axial direction and is compressed in the circumferential direction so as to be discharged in the direction perpendicular to the axial direction. As the fan means 3 rotates, the pressure in the space LS (FIG. 2), defined at the side of the cup-shaped side wall 32 of the fan means 3 adjacent to the air introduction hole 41, becomes lower than the pressure established in the radially outer space in the scroll-shaped casing 4, e.g. the space HS (FIG. 1) around the hole 48 and reaches the level of pressure at the air introduction hole. The space S defined by the cup-shaped side wall 32 and the bracket 5 is in communication with the space LS through a plurality of holes 35 formed in the side wall 32, so that the pressure in the space S is lower than the pressure in the space HS. Therefore, a part of the compressed air flowing in the scroll-shaped casing 4 is forced into a by-pass passage constituted by the hole 48, hose 7, motor means 2, space S and the hole 35.

As to the flow pattern of air in the motor means 2, as shown in FIG. 2 the air forced into the hole 48 flows through the hose 7 as indicated by solid line P. This flow of air is then deflected by deflecting means generally designated by the reference numeral 70, constituted by the inward projection 72 and the curved wall surface 73 in the end of the hose 7, at an angle of (90-θ)° to the axis line of the hole 26, and is directed toward the armature 61 without being diffused. The air then flows in a spiral form through the radial gap between the armature 61 and the permanent magnet 62 as the armature 61 rotates, to thereby effectively cool the armature 61 in which the calorific value is greater than in any other portion of the motor. Meanwhile, the air around the commutator 63 also flows accompanying the sprial flow of air coming from the hose 7, so that the commutator 63 is also more or less cooled. The air after cooling the armature 61 is returned into the scroll-shaped casing 4 through the hole 27, space S and the hole 35. Though the air coming from the hose 7 contains the moisture and the dust, the moisture and the dust attach to the armature 61 or flow along a solid line P to be separated from the air as the lattr flows through the hole 35. In the latter case, the moisture and the dust drop into the lower space between the end wall 22 and the end surface of the armature 61 Thus, the moisture and the dust never directly attach to the commutator 63.

The attaching of the moisture and the dust to the armature 61 does not matter substantially because the armature 61 consists of an iron core and coated wire wound therearound. In constrast, the attaching of the moisture and the dust to the commutator 63 causes serious problems because the outer peripheral surface of the commutator 63 is uncoated for attaining a good electric contact with the brushes 64. Namely, the moisture and the dust clog and fill the gap between adjacent copper elongate strips of the commutator 63 to cause the troubles rated hereinabove.

It will be understood by those skilled in the art that according to the invention it is possible to effectively cool the armature 61 and even the commutator 63 while advantageously avoiding contamination of the commutator 63 by the moisture and the dust carried by the cooling air. The hose 7 is preferably made of rubber because the use of rubber as the hose material permits an easy formation of the projection 72 and the curved wall 73 forming the deflecting means 70, as well as an easy parting from the mold thanks to the resiliency of the rubber. The resiliency of the rubber also permits an easy attaching of the hose 7 to the holes 26 and 48.

Figure 3:
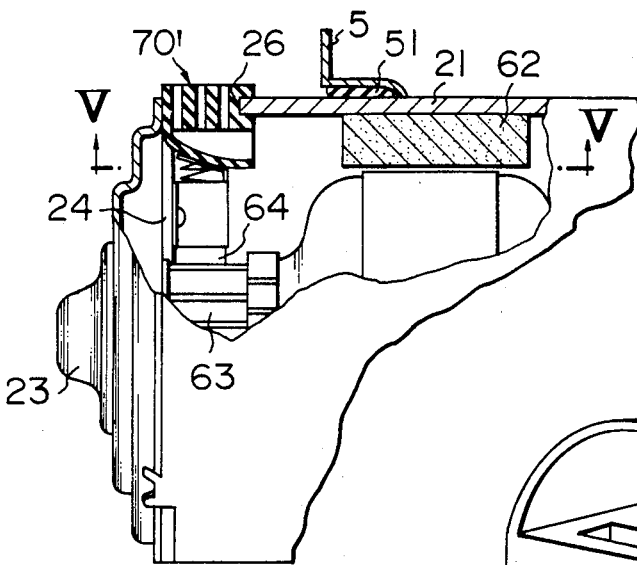
FIG. 3 is a fragmentary vertical cross sectional view of a deflecting means incorporated in another embodiment of the present invention.
Figure 4:
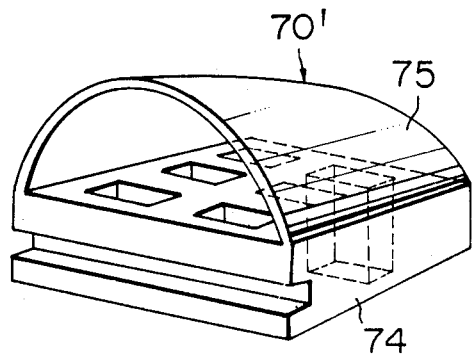
FIG. 4 is an enlarged perspective view, on an enlarged scale of the deflecting means shown in FIG. 3.

As shown in FIG. 3 instead of using the hose 7 for forcing the pressurized air in the scroll-shaped casing 4 into the housing 21 of the motor means 2, the air around the hole 26 of the housing 21 is induced into the housing 21 by means of the low pressure residing in the space LS. A deflecting means generally designated by the reference numeral 70' is provided for directing the induced air not toward the commutator 63 but toward the armature 61. As will be seen from FIG. 4, the deflecting means 70' has a plate plug 74 made of a resilient material having a plurality of through holes and closely fittable to the opening 26, and a tongue-like projection 75 formed integrally with the plate plug on the surface thereof facing the commutator 63 and having a curvature suitably selected to direct the air toward the armature 61.

Figure 5:
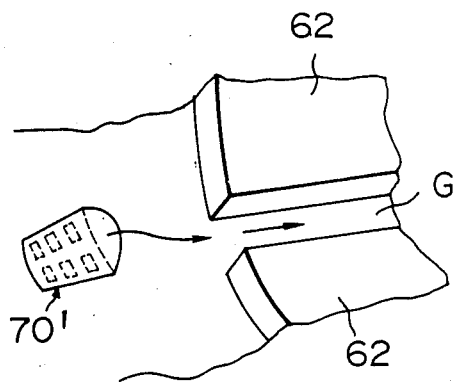
FIG. 5 is a fragmentary perspective view taken along the line V—V of FIG. 3.

In FIG. 5, the hole 26 for attaching a hose 7 to the housing 21 is formed in the side wall of the housing 21 such that the air coming out of the hose 7 is directed into the circumferential gap G between two semi-cylindrical permanent magnets 62. By so directing the air, it is possible to reduce the flow resistance against air in the housing 21 and hence to obtain a greater air flow.

Figure 6:
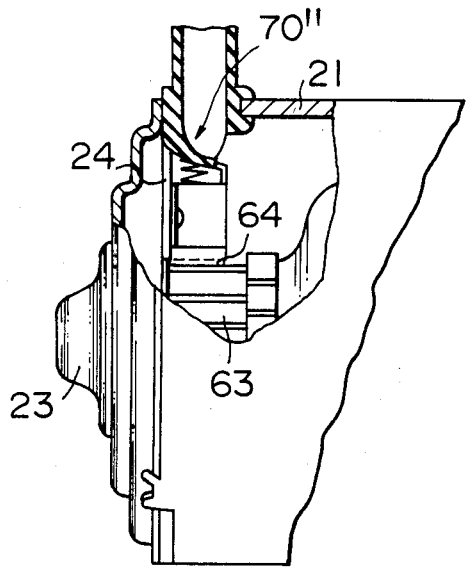
FIG. 6 is a fragmentary vertical cross sectional view of the deflecting means of a cooling apparatus in accordance with still another embodiment of the present invention.

As shown in FIG. 6 deflecting means 70" for deflecting the air toward the armature is constituted by a tongue-like member which is formed integrally on the edge of the hose 7 remote from the armature 61 at the end portion of the hose in place of the combination of the inward projection 72 and the curved wall surface 73. This embodiment offers the same advantage as that derived from the first embodiment.

As has been described, all part of the cooling air introduced into the motor means 2 is directed toward the armature 61. This, however, does not cause any substantial problem because the wire wound around the armature 61 is coated.

What is claimed is:

1. In a motor means for use in a blower apparatus having said motor means, a fan means adapted to be driven by said motor means and a casing encasing said fan means, said motor means including a housing, a permanent magnet means formed substantially in an annular form on an inner surface of said housing, a shaft projected outwardly from one end surface of said housing and rotatably supported at both ends of said housing, said fan means being fixed to the projected end portion of said shaft, an armature mounted on a portion of said shaft disposed in opposition to said permanent magnet means, a commutator mounted on the portion of said shaft opposite to said projected end portion of said shaft and located adjacent to said armature, and a brush means electrically engaging with said commutator, a cooling apparatus for cooling said motor means comprising:

an air introduction opening formed in a wall portion of said housing radially opposing said commutator;
   means for guiding a cooling air flow from said air introduction opening such that the cooling air flows along said armature into a low-pressure space in said blower apparatus, the pressure in said low-pressure space being lowered as a result of a rotation of said fan means to a level of the pressure around said air introduction opening, and deflecting means provided on a stationary part of the motor means at an upstream side of said armature as viewed in the direction of flow of said cooling air, for deflecting the cooling air from the guiding means away from the commutator and toward said armature so as to prevent a direct contact of dust and moisture in the cooling air with the commutator.

2. A cooling apparatus according to claim 1, wherein said means for guiding includes a rubber hose closely fitting said air introduction opening and providing a communication between on interior of said casing and an interior of said housing, said deflecting means includes a deflecting surface formed on an inner surface of an end portion of said rubber hose and a projection formed on said inner surface of said rubber hose in opposition to said deflecting surface.

3. A cooling apparatus according to claim 2, wherein said brush means is attached to a brush base plate disposed between said armature and the end surface of said housing opposite to the projected end portion of said shaft.

4. A cooling apparatus according to claim 1, wherein said deflecting means includes a porous plate plug closing said air introduction opening and a tongue-like projection formed on the surface of said plug in opposition to said commutator.

5. A cooling apparatus according to claim 1, wherein said means for guiding include a rubber hose closely fitting said air introduction opening and providing a communication between the space in said casing and the space in said housing, said deflecting means including a tongue-like projection integrally attached to an end surface of said rubber hose.

6. A cooling apparatus according to claim 1, wherein means are provided for fitting said deflecting means in said air introduction opening formed in the wall portion of said housing.

7. A cooling apparatus according to claim 1, wherein said deflecting means is made of an elastic material, and means are provided for fitting said deflecting means on said air introduction opening formed in the wall portion of said housing.

8. In a motor means for use in a blower apparatus having said motor means, a fan means adapted to be driven by said motor means and a casing encasing said fan means, said motor means including a housing, a permanent magnet means formed substantially in an annular form on an inner surface of said housing, a shaft projected outwardly from one end surface of said housing and rotatably supported at both ends of said housing, said fan means being fixed to the outwardly projected shaft, an armature mounted on a portion of said shaft disposed in opposition to said permanent magnet means, a commutator mounted on the portion of said shaft opposite to said outwardly projected shaft and located adjacent to said armature, and a brush means electrically engaging with said commutator, a cooling apparatus for cooling said motor means comprising:

an air introduction opening formed in a wall portion of said housing radially opposing said commutator; means for guiding a cooling air flow from said air introduction opening such that the cooling air flows along said armature into a low pressure space in said blower apparatus, the pressure in said low pressure space being lowered as a result of a rotation of the fan means to a level of the pressure around said air introduction opening, said means for guiding including a hose fitting said air introduction opening and providing a communication between the interior of said casing and the interior of said housing, and wherein deflecting means are provided on a stationary part of the motor means at an upstream side of said armature as viewed in a direction of flow of said cooling air for deflecting the cooling air from the guiding means away from the commutator and toward said armature so as to prevent a direct contact of dust and moisture in the cooling air with the commutator, said deflecting means including a deflecting surface formed on an inner surface of an end portion of said hose and a projection formed on an inner surface of said hose in opposition to said deflecting surface.

9. A cooling apparatus according to claim 8, wherein said deflecting means includes a porous plate plug closing said air introduction opening and a tongue-like projection of formed on a surface of said plug in opposition to said commutator.

* * * * *